United States Patent Office 3,397,241
Patented Aug. 13, 1968

3,397,241
PROCESS FOR THE ECONOMICAL PREPARATION
OF BR₃ ORGANOBORON COMPOUNDS
Franco Smai and Antonio Salvemini, Milan, Italy, assignors to Montecatini Edison S.p.A., Milan, Italy
No Drawing. Filed Dec. 29, 1964, Ser. No. 422,027
Claims priority, application Italy, Jan. 2, 1964,
6/64, 7/64
14 Claims. (Cl. 260—606.5)

ABSTRACT OF THE DISCLOSURE

A process for producing triorganoboron compounds having direct bonds between boron and the carbon atoms of the organic groups, comprising the steps of reacting a Grignard reagent having the general formula RMgX, where R is a hydrocarbon radical selected from the group consisting of alkyl, aryl, cycloalkyl and aralkyl radicals, and X is a halogen selected from the group consisting of chlorine, bromine and iodine, with boron oxide in the presence of a boron-containing activator selected from the group which consists of boron trifluoride, boron trifluoride addition compounds and organic esters of boric acid and in an organic solvent selected from the group which consists of hydrocarbons and ethers nonreactive with the Grignard reagent.

---

The present invention relates to the production of organic boron compounds containing direct carbon-boron bonds and usually having the general formula $BR_3$, where R represents an alkyl, aryl, cycloalkyl or aralkyl hydrocarbon group or radical; such compounds will be designated hereinafter as triorganoborons or trinorganoborines in conformity with conventional nomenclature.

It is known that triorganoborons having the structural formula given above can be made by reacting a Grignard reagent containing the desired organic group with boron-containing compounds of elements commonly considered to "exchange" for the organo group. Suitable Grignard reagents or compounds have the general formula RMgX, where R represents the organo group or radical (e.g. alkyl, aryl, cycloalkyl or aralkyl), Mg is a magnesium atom, and X is a halogen, preferably chlorine, bromine or iodine.

In conventional systems, the boron derivatives with which the Grignard reagent reacts to form the organo-boron are generally boron trichloride, boron trifluoride or organic esters of boric acid. These derivatives are not available naturally, however, nor can they be derived without considerable trouble and expense from naturally occurring boron compounds. It has thus been found to be relatively uneconomical to produce triorganoborines by the Grignard process or by other means requiring the prior preparation of expensive boron compounds. The problem is all the more acute when it is considered that the Gringard reagents will react only at comparatively slow rates and with poor yields with more commonly available boron compounds such as as boron trioxide ($B_2O_3$), this compound also being termed boric oxide or boric anhydride.

It is the principal object of the present invention, therefore, to provide an improved process for the production of triorganoborines with comparatively high yields from the more readily available and less expensive raw materials.

A more specific object of this invention is to provide a process for the commercial production of organoboron compounds with direct boron-carbon bonds utilizing, at least in part, raw materials which are available at relatively low cost.

These objects and others which will become apparent hereinafter are attained, according to the present invention, by a process embodying the surprising discovery that boric oxide or anhydride can be used as a raw material for the Grignard reaction to produce triorganoborines in reasonable and commercially satisfactory yields when the reactant mixture contains, in addition to the boron oxide, a quantity of boron trifluoride or an organic ester of boric acid. The discovery that, while boric oxide alone does not react with a Grignard reagent to any material extent but, in the presence of boron trifluoride or boric-acid organo esters, is capable of conversion to triorganoborines, is surprising in view of the fact that it has heretofore been considered necessary to use the Grignard reagent only with the more readily reactive boron derivatives mentoned earlier. Thus, according to the invention, boron oxide can be substituted for a minor or major portion, as desired, of the more expensive compounds and is especially effective when employed together with boron trifluoride ($BF_3$), etherates and other addition compounds thereof, and organoesters of boric acid having the general formula $B(-OR')_3$ where R' can be an alkyl group.

More particularly, the process of the present invention provides for the reaction of a mixture of boron oxide ($B_2O_3$) and a Grignard reagent of the general formula RMgX in the presence of boron trifluoride or an organoester of boric acid, R being a radical selected from the alkyl, aryl, cycloalkyl and aralkyl groups, while X is a halogen—preferably bromine, chlorine and iodine. The quantity of the reaction activator (i.e. the boron trifluoride or organoester of boric acid) present in the reaction mixture, should range up to substantially equimolar quantities with respect to the boric oxide. The boron-containing activator, of course, reacts with the Grignard reagent to produce the corresponding triorganoborine $BR_3$, where the R represents the organic group of the Grignard reagent. It is thus evident that the products of the present invention can be trialkylborines, triarylborines, tricycloalkylborines and triarylalkylborines.

According to a more specific feature of the present invention, the reaction is carried out in a solvent in which the boric oxide, either in form of relatively fine crystals or powder, together with the other boron derivative are dissolved. The boric oxide thus should be perfectly dry and ground to a particle size of 30 to 120 mesh prior to dissolution. The solvent for the reaction can be any of those which do not react with a Grignard reagent.

Organic solvents of this class include hydrocarbon solvents and ethers, which must be in an anhydrous state, to preclude reaction with the Grignard reagent. Best results are obtained when the solvent has a boiling point under the working conditions in excess of 100° C. and the boric oxide together with the other boron derivative are dissolved in the solvent by heating them to an elevated temperature slightly higher than 100° C. for a period of substantially 2 to 12 hours. The best solvents for the purpose of the present invention have been found to be benzene, toluene, diethyl or monoethyl benzenes, xylene, dodecane, isooctane, di-n-butylether, and diethyleneglycol-diethylether, alone or in mutual admixtures. The organic solvent should be present in an amount ranging between substantially 500 to 2500 ml. per 100 grams of boric anhydride, although the ratio of solvent to boric anhydride may vary effectively within a wide range.

As noted above, the boron-containing activator of the present invention may include organoesters of boric acid and boron halides; they preferably consist of a boron-trifluoride compound or a trialkyl borate.

Best results are obtainable with activators of the latter class, the activator being selected from the group of trimethyl borate and triethyl borate. The boron trifluoride is preferably present either in the gaseous state in which case it can be bubbled through a suspension of the boric oxide in the organic solvent, or as an etherate (e.g. $BF_3 \cdot (C_2H_5)_2O$) which is admixed with the boric oxide and is dissolved together therewith in the solvent. The molar ratio of organoester of boric acid to the boric oxide should range, according to this invention, between substantially 0.2 and 1 with optimum results being obtainable with a molar ratio of approximately 0.5. When boron trifluoride or addition compounds thereof are employed, the molar ratio of boron trifluoride and the boric anhydride should range between 0.5 and 1; best results are observed at a molar ratio of approximately 0.75.

According to still another feature of the present invention, the reaction is carried out in four successive steps whereby, in the first stage, a mixture of boric anhydride and the boron-containing activator is heated with stirring at a temperature of 100 to 150° C.; in a second stage, the organic solvent is added in an amount sufficient to form a suspension of the boron-containing ingredients in the solvent; subsequently, the mixture or suspension is heated at a temperature between 110° and 150° C. for a period sufficient to result in complete dissolution of the boric anhydride; and, thereafter, a previously prepared Grignard reagent is added slowly to the reaction mixture in such manner as to maintain its temperature. The triorganoborine is then distilled from the reaction mixture, preferably under a nitrogen stream.

The following specific examples are provided as illustrative of the present invention and the best mode known to applicants for taking advantage of same:

Example I 7.74 grams of powdered $B_2O_3$ (0.11 mole) and 11.5 grams of trimethylborate (0.11 mole) together with 75 ml. of anhydrous benzene were put into a 500-ml. flask provided with a thermometer, a reflux cooler (e.g. condenser), a supply tube for introduction of nitrogen, and a stirrer.

The flask was heated at the boiling point of the mixture until all $B_2O_3$ was dissolved; thereafter, a solution of ethyl magnesium bromide (Grignard reagent) in di-n-butylether was added dropwise with care being taken to maintain the reaction temperature at 100–120° C.

The Grignard reagent was prepared according to the usual procedures from 24 grams of metallic magnesium and 108 grams of ethylbromide. The alkylmagnesium halide was recovered from the anhydrous butylether.

After the addition of the Grignard reagent, the reaction mixture was maintained for one hour at 140° C. and then distilled in a nitrogen stream; the fraction with a boiling point of 94–95° C. was collected.

The yield of $B(C_2H_5)_3$ (triethylboron or triethylborine), calculated on the starting total boron amounts either as $B_2O_3$ or as trimethylborate, was equal to 60% (by weight).

Example II 5.8 grams of powdered (100 mesh) $B_2O_3$ (0.0835 mol), 12.4 grams of triethylborate of 97% purity (0.085 mol) and 75 ml., a mixture of the three isomers of diethylbenzene was put into a reactor vessel similar to the one described in the previous example. The mixture was heated with stirring to a temperature of 120° C. and the $B_2O_3$ found to dissolve rapidly and completely.

Thereafter a solution of a Grignard reagent (ethylmagnesium bromide) prepared from 18 grams of magnesium chips and 81.8 grams of ethylbromide in 200 ml. of di-n-butylether was slowly added. After this addition the reaction mixture was heated for an hour at 120° C.; then the mixture was distilled in a nitrogen stream, collecting the fraction boiling at 94–95° C.

The yield of $B(C_2H_5)_3$, calculated on the total starting boron, was equal to 68%.

Example III

The Example II was repeated starting with 5.8 grams of $B_2O_3$ (0.0835 mol) and 9.3 grams (0.0620 mol) of $B(OC_2H_5)_3$ (i.e. triethyl borate of 97% purity), about 75% of the stoichiometric amount with respect to $B_2O_3$.

The yield of $B(C_2H_5)_3$, calculated on the total starting boron amounts, was equal to 65%.

Example IV

The Example I was repeated by employing the following amounts of reactants: 5.8 grams $B_2O_3$; 6.2 grams of $B(OC_2H_5)_3$ (of 97% purity) (0.0417 mol or about 50% of the stoichiometric amount with respect to $B_2O_3$); and 75 ml. diethylbenzene. Triethylboron ($B(Et)_3$) was obtained with a yield of 63% based upon total boron present in the reaction mixture.

Example V

Operating under the same conditions of the previous examples, adding to a solution of 6.9 grams of $B_2O_3$ (0.1 mol) and 7.6 grams of triethylborate of 97% purity (0.05 mol or 50% of the stoichiometric amount with respect to the $B_2O_3$) in 75 ml. of diethylbenzene, a Grignard-reagent solution of n-butylmagnesium chloride in dinormalbutylether (the Grignard reagent being present in stoichiometric equivalency with boron to yield the corresponding triorganoborine), tri-n-butylboron was obtained with a yield equal to 45% based upon total boron present in the reaction mixture.

Example VI

A solution of cyclohexylmagnesium chloride in di-n-butylether was slowly added to a solution of 5.8 grams of $B_2O_3$ (0.0835 mol) and 12.4 grams of triethylborate of 97% purity (0.0835 mol) prepared in accordance with Example I. The Grignard reagent had been prepared, as usual, from 18 grams of magnesium and 88.5 grams of cyclohexylchloride in anhydrous ether. Tricyclohexylboron

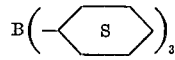

was formed with a yield of 55% based upon total boron present in the reaction mixture.

Example VII

By using the same reaction conditions of the previous examples, a solution of phenylmagnesium bromide in di-n-butylether was added to a solution of 5.8 grams of $B_2O_3$ and 12.4 grams of triethylborate of 97% purity in 75 ml. of diethylbenzene. The Grignard reagent was prepared, in the usual manner, from 18 grams of magnesium and 118 grams of bromobenzene in anhydrous ether. Triphenylboron

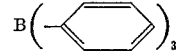

was obtained with a yield of 50% based upon total boron.

Example VIII 5.8 grams of the powdered $B_2O_3$ (0.0835 mol) were placed in a 500-ml. flask provided with a stirrer, a thermometer, a reflux condenser and a supply tube for nitrogen. After a flushing of the flask with a dry-nitrogen stream, 12.4 grams of borontrifluoride-diethyletherate ($BF_3 \cdot (C_2H_5)_2O$) of 95% purity (0.0835 mol) were added. The mixture stirred for 45 minutes at a temperature of 110° C.–120° C.

Thereafter 50 ml. of diethylbenzene were slowly added drop by drop and the mixture was maintained at 110° C. for about six hours. Then, drop by drop, a solution of ethylmagnesium bromide in di-n-butylether was added.

As the first step of the reaction was strongly exothermic, the addition of the $C_2H_5$-MgBr was carried out in such manner as to maintain the reaction temperature at 110° C.–120° C.

The thus formed triethylboron was removed from the reaction mixture by distillation in a nitrogen stream, the fraction boiling at 94–95° C. being collected.

The yield of $B(C_2H_5)_3$, calculated on the total starting boron as $B_2O_3$ and $BF_3 \cdot (C_2H_5)_2O$, was equal to 65%.

Example IX

The technique of Example VIII was repeated starting with 5.8 grams of $B_2O_3$ (0.0835 mol), 9.3 grams of $BF_3 \cdot Et_2O$ of 95% purity degree (0.0621 about 75% of the stoichiometric amount with respect to $B_2O_3$) and 50 ml. of diethylbenzene. The yield of triethylboron was equal to 53% based upon total boron.

Example X

Following the same procedure as in Examples VIII and IX, a solution of the Grignard reagent $C_6H_5MgBr$ in di-n-butylether was reacted with a solution of 6.9 grams (0.1 mol) of $B_2O_3$ and 15.1 grams (about 0.1 mol) of $BF_3 \cdot Et_2O$ of 95% purity. The Grignard reagent

was prepared from 21.8 grams of magnesium and 141.3 grams of bromobenzene in anhydrous ether. Triphenylboron was obtained with a yield equal to 50% based upon the total boron of the mixture.

Example XI 35 grams of 60–65 mesh powdered $B_2O_3$ (0.5 mol), 76 grams of triethylborate of 97% purity (about 0.5 mol) and 450 ml. of diethylbenzene were placed in a 3-liter flask similar to those of the preceding examples. The flask was heated at the boiling point of the mixture to complete dissolution of $B_2O_3$; thereafter a solution of ethyl magnesium chloride was slowly added dropwise, with care being taken to maintain the reaction temperature at 100–120° C. The Grignard reagent was prepared from 108 grams of metallic magnesium and 290 grams of ethylchloride in di-n-butylether in anhydrous ether. After the addition of the Grignard reagent, the reaction mixture was kept for another hour at 140° C. and was distilled under a nitrogen stream, collecting the fraction with a boiling point 94–95° C. The yield of $B(C_2H_5)_3$, calculated on the total quantity of boron, originally present, was equal to 78%.

Example XII

The method and proportions of Example VIII are employed except that the boron trifluoride-diethyletherate was not used and the boric oxide was heated merely in the presence of the methylbenzene. Prior to the dropwise addition of the Grignard reagent, boron trifluoride was bubbled through the reactant mixture at a rate of several cc. per minute. The addition of the Grignard reagent was commenced while bubbling of the boron trifluoride was continued. Unreacted boron trifluoride was recovered and, upon distillation under a nitrogen stream, the yield of triethyl-boron was found to be 50%, based upon the total boron present as boric oxide and to consume as boron trifluoride.

Example XIII

To demonstrate whether boric oxide was significantly reacted in accordance with the systems of Examples I through XII, the technique of Example I was employed except that 0.22 mole of boron oxide was used and the trimethylborate was omitted entirely and the boric oxide immediately dissolved in the 75 ml. of anhydrous benzene with heating over a period of several hours. The Grignard reagent was then added. The yield of triethylboron was found to be 0.5%, based upon the total boron present. When the reaction was carried out omitting the boric oxide component and using of 0.11 mol of trimethylborate as the boron-containing starting substance, a yield of triethylboron of 75%, based upon the original boron content of the reactant mixture. The yields given above demonstrate that there is a significant improvement in the conversion of boric oxide to a trialkylboron compound when a boron-containing activator is employed.

We claim:
1. A process for producing triorganoboron compounds having direct bonds between boron and the carbon atoms of the organic groups, comprising the steps of reacting a Grignard reagent having the general formula RMgX, where R is a hydrocarbon radical selected from the group consisting of alkyl, aryl, cycloalkyl and aralkyl radicals, and X is a halogen selected from the group consisting of chlorine, bromine and iodine, with boron oxide in the presence of a boron-containing activator selected from the group which consists of boron trifluoride, boron trifluoride addition compounds and organic esters of boric acid and in an organic solvent selected from the group which consists of hydrocarbons and ethers nonreactive with the Grignard reagent.

2. The process defined in claim 1 wherein said activator is present in a reaction mixture with said boron oxide in said organic solvent in a quantity ranging up to substantially equimolar amounts with respect to said boron oxide, said solvent having a boiling point in excess of 100° C. under the working conditions.

3. The process defined in claim 2 further comprising the steps of: initially heating said boron oxide with said activator; subsequently adding to the heated mixture of said boron oxide and said activator the organic solvent in a quantity sufficient to form a suspension of said boron oxide and said activator; thereafter heating the suspension to dissolve completely said boron oxide in said solvent; and then adding said Grignard reagent to the resulting solution.

4. The process defined in claim 2 wherein said organic esters are alkyl borates selected from the group consisting of trimethyl borate and triethyl borate.

5. The process defined in claim 4 wherein the activator is one of said organic esters and is present in the reaction mixture in a molar ratio with said boron oxide ranging between substantially 0.2 and 1.

6. The process defined in claim 5 wherein the molar ratio of said one of said organic esters and said boron oxide is substantially 0.5.

7. A process for producing triorganoboron compounds having direct bonds between boron and the carbon atoms of the organic groups, comprising the steps of reacting a Grignard reagent having the general formula RMgX, where R is a hydrocarbon radical selected from the group consisting of alkyl, aryl, cycloalkyl and aralkyl radicals, and X is a halogen selected from the group consisting of chlorine, bromine and iodine, with boron oxide in the presence of gaseous boron fluoride activator, said activator being present in a reaction mixture with said boron oxide in an organic solvent in a quantity ranging up to substantially equimolar amounts with respect to said boron oxide, said solvent being selected from the group consisting of hydrocarbons and ethers nonreactive with said Grignard reagent and having a boiling point in excess of substantially 100° C. under the working conditions, said gaseous boron trifluoride being bubbled through the reaction mixture.

8. The process defined in claim 7 wherein the molar ratio of said boron trifluoride and the boron oxide present in the reaction mixture is substantially 0.5 to 1.

9. A process for producing triorganoboron compounds having direct bonds between boron and the carbon atoms of the organic groups, comprising the steps of reacting a Grignard reagent having the general formula RMgX, where R is a hydrocarbon radical selected from the group consisting of alkyl, aryl, cycloalkyl and aralkyl radicals, and X is a halogen selected from the group consisting of chlorine, bromine and iodine, with boron oxide in the presence of a boron-containing activator, said activator being present in a reaction mixture with said boron oxide in an organic solvent in a quantity ranging up to substantially equimolar amounts with respect to said boron oxide, said solvent being selected from the group consisting of hydrocarbons and ethers nonreactive with said Grignard reagent and having a boiling point in excess of substantially 100° C. under the working conditions, said activator being a liquid boron-trifluoride etherate.

10. The process defined in claim 9 wherein said boron-trifluoride etherate is present in a molar ratio with said boron oxide in the reaction mixture ranging between substantially 0.5 and 1.

11. The process defined in claim 10 wherein the molar ratio of said boron-trifluoride etherate and the boron oxide in said reaction mixture is substantially 0.75.

12. The process defined in claim 2 wherein said boron oxide and said activator are heated to a temperature ranging between substantially 100° and 150° C. prior to the addition of the solvent thereto.

13. The process defined in claim 12 wherein the reaction mixture of said solvent, said boron oxide and said activator is maintained at a temperature ranging between substantially 110 and 150° C. during addition of said Grignard reagent thereto.

14. A process for producing triorganoboron compounds having direct bonds between boron and the carbon atoms of the organic groups, comprising the steps of reacting a Grignard reagent having the general formula RMgX, where R is a hydrocarbon radical selected from the group consisting of alkyl, aryl, cycloalkyl and aralkyl radicals and X is a halogen from the group consisting of chlorine, bromine and iodine, with boric oxide in the presence of a boron-containing activator selected from the group which consists of boron trifluoride and boron-trifluoride addition compounds in an organic solvent selected from the group which consists of hydrocarbons and ethers nonreactive with said Grignard reagent.

References Cited

UNITED STATES PATENTS 3,099,677   7/1963   Hunter _____ 260—462

OTHER REFERENCES

Kosolapoff: Chem. Abstracts, vol. 54 (1960), p. 1269(b). 1269(b).

TOBIAS E. LEVOW, *Primary Examiner.*

W. F. W. BELLAMY, *Assistant Examiner.*